(12) United States Patent
Orhan

(10) Patent No.: US 11,496,510 B1
(45) Date of Patent: *Nov. 8, 2022

(54) FULLY AUTOMATED TARGET IDENTIFICATION OF A PHISHING WEB SITE

(71) Applicant: NuRD LLC, Clifton, NJ (US)

(72) Inventor: Fatih Orhan, Cedar Grove, NJ (US)

( * ) Notice: Subject to any disclaimer, the term of this patent is extended or adjusted under 35 U.S.C. 154(b) by 186 days.

This patent is subject to a terminal disclaimer.

(21) Appl. No.: 16/547,319

(22) Filed: Aug. 21, 2019

Related U.S. Application Data

(60) Provisional application No. 62/722,827, filed on Aug. 24, 2018.

(51) Int. Cl.
H04L 9/40 (2022.01)

(52) U.S. Cl.
CPC ...... H04L 63/1483 (2013.01); H04L 63/1416 (2013.01)

(58) Field of Classification Search
USPC .......................................................... 726/23
See application file for complete search history.

(56) References Cited

U.S. PATENT DOCUMENTS

| | | | |
|---|---|---|---|
| 7,634,810 | B2 | 12/2009 | Goodman et al. |
| 7,854,001 | B1 | 12/2010 | Chen et al. |
| 7,925,883 | B2 | 4/2011 | Florencio et al. |
| 8,566,938 | B1 | 10/2013 | Prakash et al. |
| 2006/0080735 | A1 | 4/2006 | Bronson et al. |
| 2007/0199054 | A1 | 8/2007 | Florencio et al. |
| 2013/0263226 | A1* | 10/2013 | Sudia ............... G06F 21/60 726/4 |
| 2015/0106614 | A1* | 4/2015 | Lee ................... H04W 12/02 713/150 |
| 2018/0063190 | A1* | 3/2018 | Wright ............. H04L 63/1416 |

OTHER PUBLICATIONS

M. Aburrous, et al., "Intelligent Detection System for e-banking Phishing websites using Fuzzy Data Mining", Expert Systems with Applications 37, pp. 7913-7921, 2010.
L. Wenyin, et al., "Phishing Web page detection", Document Analysis and Recognition, 2005.
S. Afroz and R. Greenstadt, "Phishzoo: An automated web phishing detection approach based on profiling and fuzzy matching," Drexel University, Tech. Rep., Mar. 2009.
A. Jain and V. Richariya, "Implementing a Web Browser with Phishing Detection Techniques", World of Computer Science and Information Technology Journal (WCSIT), vol. 1, No. 7, 289-291, 2011.
A. Bergholz, et al., Improved phishing detection using model-based features. In CEAS, 2008.

(Continued)

*Primary Examiner* — Sakinah White Taylor
(74) *Attorney, Agent, or Firm* — Joseph P. Aiena

(57) ABSTRACT

The current invention is a method of fully automated target identification of a phishing website if a website requests input data from user with deceptive contents (logo, URL path, text in html) and a randomized/wrong data is provided and the website is redirecting to a different domain related with the logo, URL path or text in html. By determining existence of relationships, the website is detected as phishing and the phishing target is automatically identified.

5 Claims, 3 Drawing Sheets

(56) References Cited

OTHER PUBLICATIONS

G. Fehringer and P. A. Barraclough, "Intelligent Security for Phishing Online using Adaptive Neuro Fuzzy Systems", (IJACSA) International Journal of Advanced Computer Science and Applications, vol. 8, No. 6, 2017.

G. Ramesh et al., "Identification of phishing webpages and its target domains by analyzing the feign relationship", Journal of Information Security and Applications, vol. 35, pp. 75-84, Aug. 2017.

C. LinTan, et al., "PhishWHO: Phishing webpage detection via identity keywords extraction and target domain name finder", Decision Support Systems, vol. 88, pp. 18-27, Aug. 2016.

G. Liu, et al., "Automatic Detection of Phishing Target from Phishing Webpage", 20th International Conference on Pattern Recognition, 2010.

K. Kumar and K. Alekhya, "Detecting Phishing Websites using Fuzzy Logic", International Journal of Advanced Research in Computer Engineering & Technology (IJARCET), vol. 5, Issue 10, Oct. 2016.

S. Abu-Nimeh, et al., "A Comparison of Machine Learning Techniques for Phishing Detection", Proceedings of the anti-phishing working groups 2nd annual eCrime researches summit, pp. 60-69, 10 2007.

G. Ramesh, et al., "An efficacious method for detecting phishing webpages through target domain identification", Decision Support Systems, vol. 61, pp. 12-22, May 2014.

\* cited by examiner

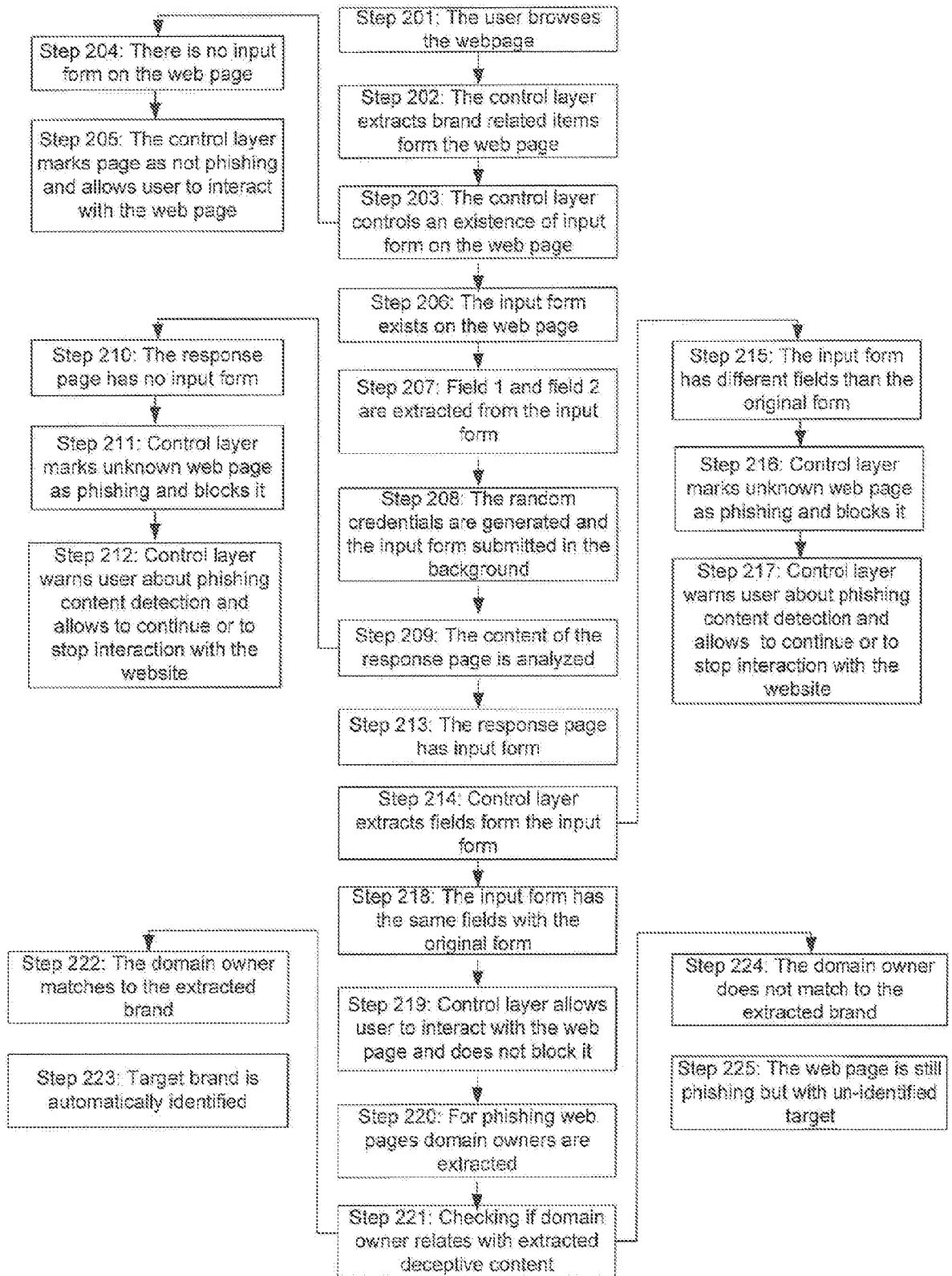

FULLY AUTOMATED TARGET IDENTIFICATION OF A PHISHING WEB SITE

CROSS REFERENCE TO RELATED APPLICATIONS

This application claims benefit of and priority to U.S. Provisional Application No. 62/722,827 filed on Aug. 24, 2018, incorporated by reference herein in its entirety.

BACKGROUND

Phishing is performed in many different ways and one of the major targets of this act is to steal user's sensitive information. The simple scenario for this malicious act is like: a phishing website pretends to be a reputable web site and requests sensitive information from the user (email, username & password, credit card information, SSN number etc.) The user provides the requested information and submits it, without knowing the site is fake. The user sensitive data is sent to criminals and information is utilized for malicious purposes.

Current techniques to detect phishing web pages are using several features of web pages such as URL syntax, DOM tree layout similarity, JavaScript codes, page style, domain identity, etc. There are also other methods that use features from email messages that contain URL itself and try to classify URL according to features extracted from email.

There are also methods that use whitelisting and blacklisting based approaches to detect phishing sites. These lists of malicious and safe web sites are being generated with either human validation or using simple rules, and when a web site is found in phishing blacklist, it is immediately marked as phishing and blocked by any protection component. Phishing target identification for blacklisted phishing web pages shall also be prepared with corresponding URL-Brand mapping before user visits the web page.

In addition to phishing web page detection, there are also other techniques to identify targets of phishing pages together with phishing detection heuristically such as: using feign relationships which exist between the webpage and its associated domains through in-degree link associations; direct and indirect domain association with performing DNS lookup; weighted URL tokens from textual keywords of web sites using n-gram modeling; link, ranking, text and layout similarity modelling using DBSCAN clustering.

Disadvantage of blacklisting and whitelisting approach is its lack of zero-day phishing detection capability. Also phishing target identification for all blacklisted malicious URLs is not practical since they do not use fully automated target identification methods.

When user browses a web page that is not either in blacklist or in whitelist, these techniques are unable to provide a classification result to user, and if this unknown web page is phishing it misses the detection. Other heuristic techniques that are developed for phishing detection and phishing target identification have no interaction with the unknown page and use only static features of it. Those approached have a potential to detect phishing pages up to some accuracy yet they are unable to interact with the page and analyze the behavior of unknown site by providing some dummy user actions.

Thus there is need in new method for identification of a phishing website in automated and effective manner so to protect users from forgers while they are surfing unknown website.

SUMMARY OF THE INVENTION

The current invention is a method of fully automated target identification of a phishing website if a website requests input data from user with deceptive contents (logo, URL path, text in html) and a randomized/wrong data is being provided and the website is redirecting to a different domain related with the logo, URL path or text in html.

According to present invention, when user receives a web site having an input form asking sensitive information, first an analysis is conducted in order to identify a well-known brand/company from logo, URL path or text in html. If there is an evidence of a well-known brand/company, it's been recorded, then false credentials are being generated and submitted in background for the form present in the phishing website. After the form is submitted the expected behavior of the malicious server is to redirect the website to the well-known company/brands legitimate website. To identify this, our engine checks response page whether it is hosted on a domain related with the legit brand/company. If such a relation is found, then the website has been detected as phishing and the phishing target is automatically identified.

Existing control layers using blacklisting/whitelisting, or heuristic techniques to detect phishing web pages and their targets have no interaction with the web page and do not analyze its behavior in real-time. Moreover, heuristic techniques developed so far are using static content of web pages and try to use similarity properties and various anomalies to classify unknown pages. Invention method triggers interaction with web page and analyzes its behavior before actual real user interaction. This allows more enhanced phishing site detection, compared to existing techniques, that is capable to detect zero-day phishing web pages. This way the users are protected from these phishing websites and their sensitive data are not submitted to criminals' servers.

The system would limit the user when a website is not in whitelist but actually is not a phishing website and legit in all means. Since the control layer sends fake/random data to the legit website, the usability is affected. To overcome this, the users are enabled with a functionality having "Allow this website" button after the fake data have been submitted once. That usability is helpful if users would want to be protected than to be sorry.

BRIEF DESCRIPTION OF DRAWINGS

FIG. 2A is a flowchart of the invention where fully automated phishing target identification is implemented.

DETAILED DESCRIPTION

The present invention discloses the method of fully automated target identification of a phishing website if a website requests input data from user with deceptive contents (logo, URL path, text in html) and a randomized/wrong data is being provided and the website is redirecting to a different domain related with the logo, URL path or text in html.

Figure 1:
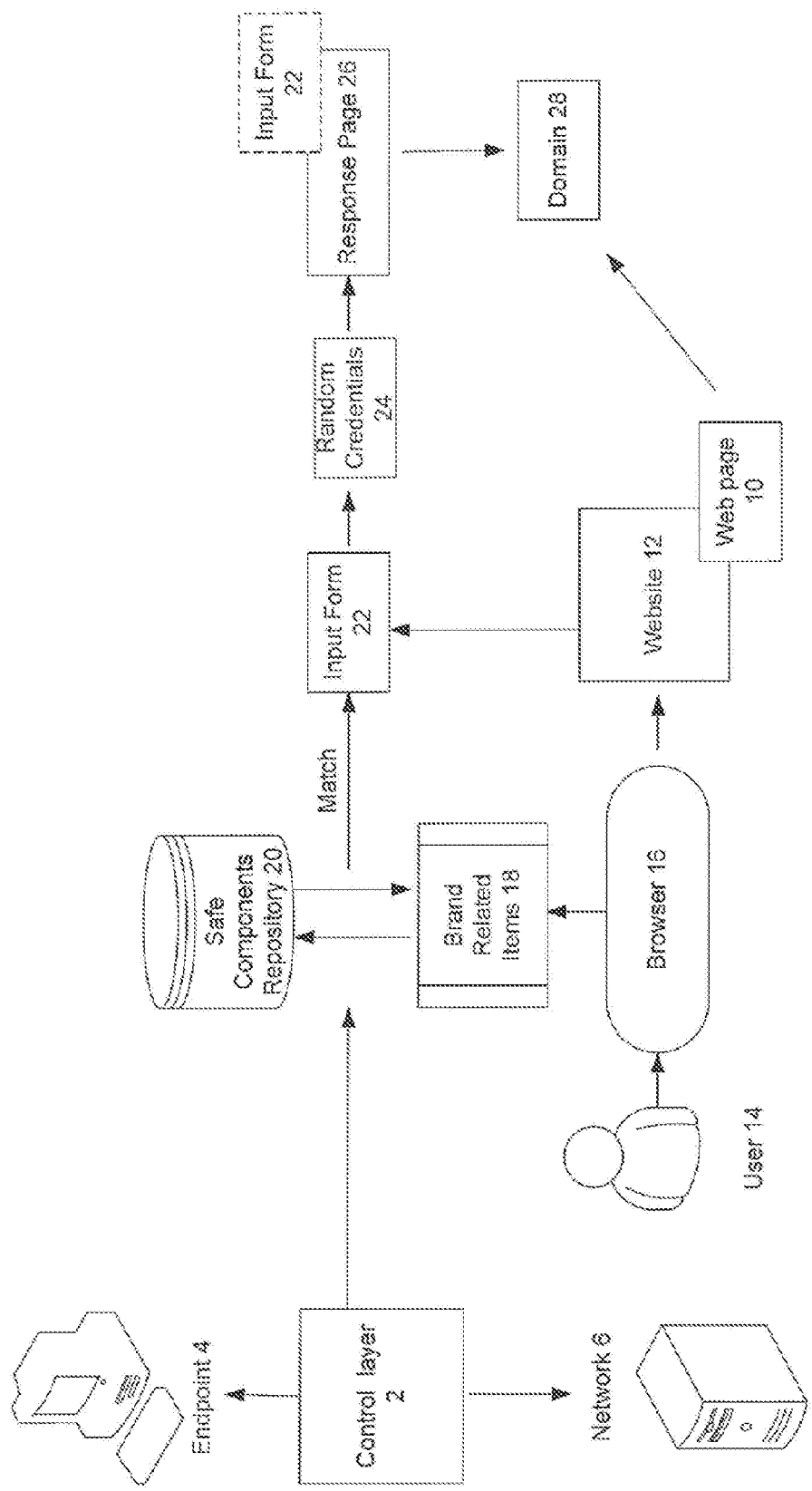
FIG. 1 is a depiction of the general scheme of the invention.

FIG. 1 depicts a general scheme of the invention. There is a system of the deceptive content control layer 2 deployed on endpoint 4 or on network 6 and tracking possible deceptive content 8 on the web page 10 of web site 12 being visited by users 14. When the user 14 visits the web site 12 through browser 16, the brand related info 18, that is HTML content, images and logos on the web page 10, favicon and URL of the visited web page 10, is being checked for the possible deceptive content 8 match based on already prepared safe components repository 20. If any component of the brand related items 18 being tracked matches with the safe repository 20, the input form 22 existence on the web page 10 is being controlled. In case there is any input form in the web page 10, the control layer 2 submits random credentials 24 through form in background and waits for the response page 26. When the response page 26 is retrieved, the control layer 2 checks whether it has the input form 22 with the same fields or not and the domain 28 of the web page 10 is being checked. If the responded domain 28 matches to a legitimate domain that matched to possible deceptive components 8, and it has the input form 22 with different fields or no form at all, the initial web page 10 is marked as phishing and its target is identified as final legitimate web page.

Figure 2B:
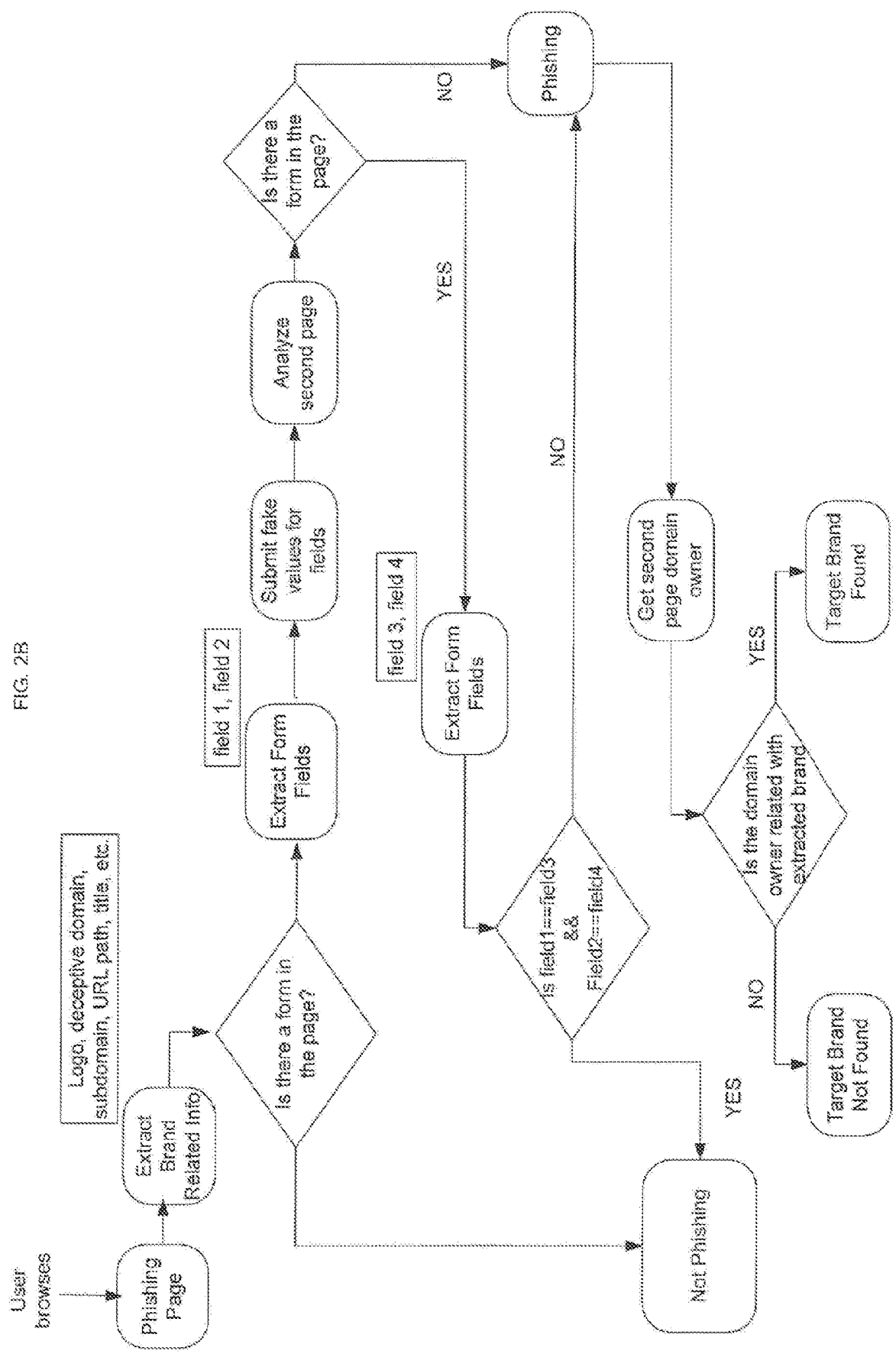
FIG. 2B is a depiction of the invention where fully automated phishing target identification is implemented.

FIGS. 2A and 2B are flowchart and depiction of the invention where fully automated phishing target identification is implemented. In step 201 the user 14 browses the web page 10 through the browser 16. This web page 10 might be phishing or unknown at the moment. In step 202 the deceptive content control layer 2 extracts brand related items 18 from the web page 10. These items might be logo, deceptive subdomain, URL path, HTML text, title, favicon, etc. In step 203 the deceptive content control layer 2 controls an existence of the input form 22 on the web page 10. In step 204 it is detected that there is no input form 22 on the web page 10. In step 205 the deceptive content control layer 2 marks the web page 10 as not phishing and allows the user 14 to interact with the web page 10. In step 206 it is detected that the input form 22 exists on the web page 10. In step 207 fields 30 (field 1 and field 2) are extracted from the input form 22. In step 208 the random credentials are being generated and the input form 22 is submitted in background using these random data. In step 209 after the input form submission, the response page 26 is being collected and the content of the response page 26 is analyzed in background. In step 210 the response page 26 has no input form 22. In step 211 the control layer 2 marks the unknown web page 10 as phishing and blocks it. In step 212 the control layer 2 warns the user 14 about phishing content detection and allows users to continue using the web site 12 or stop interaction with it. In step 213 the response page 26 has input form 22. In step 214 the control layer 2 extracts fields from the input form 22 presented in the response page 26. Let's assume that field 3 and field 4 are extracted. In step 215 the input form 22 has different fields than the original. In step 216 the control layer 2 marks unknown web page 10 as phishing and blocks it. In step 217 the control layer 2 warns user 14 about phishing content detection and allows them to continue using the site or stop interaction with it. In step 218 the input form 22 has the same fields with the original input form. In step 219 the control layer 2 allows user 14 to interact with the web page 10 and does not block it. In step 220 for web pages 10, marked as phishing, domain owner of the response page 26 is being extracted. In step 221 the control layer 2 checks whether domain owner of the response page 26 is related with extracted deceptive content 8. In step 222 the domain owner of the response page 26 matches to the extracted brand. In step 223 target brand of this phishing web page is automatically identified. In step 224 the domain owner of the response page 26 does not match to the extracted brand. In step 225 the web page 10 is still phishing but with an un-identified target.

The invention is not restricted to the details of the foregoing embodiments. The invention extend to any novel one, or any novel combination, of the features disclosed in this specification (including any accompanying claims, abstract and drawings), or to any novel one, or any novel combination, of the steps of any method or process so disclosed.

What is claimed is:

1. A method of fully automated target identification of a phishing website, implemented by a deceptive content control layer, where a website requests from a user input data with deceptive contents (logo, URL path, text in html), and randomized/wrong data is being provided, afterwards the website is redirecting to a different domain related with the logo, URL path or text in html comprising:

receiving said website by said user whereas said website has an input form asking for sensitive information;

conducting an analysis which extracts a brand related items identifying a well-known brand or company from logo, URL path or text in html;

checking said brand related items by said deceptive content control layer for a deceptive content match from a safe components repository and determining said input form is controlled upon matching said brand related items with said safe components repository;

recording said brand related items, generating said randomized/wrong data and submitting as false credentials for said input form of phishing website in background when there is an evidence of said well-known brand or company;

checking by said deceptive content control layer a response page whether it is hosted on a domain related with the legit said well-known brand or company; and identifying said website as a phishing site and identifying said phishing target automatically when said response page is hosted on said domain related with the legit said well-known brand or company and where said phishing target brand of said phishing website is identified comprising:

browsing said website by said user;

extracting said brand related items from said website by said deceptive content control layer;

allowing by said deceptive content control layer said user to interact with said website, when unknown website has no said input form; marking said website as not phishing;

extracting first and second fields (field 1 and field 2) from said input form when said input form exists on said website;

generating said false credentials for the first field (field 1) and the second field (field 2) and submitting said input form in background using said false credentials when said website has said input form;

analyzing in background the content of said response page retrieved after form submission;

checking whether said response page of said false credentials submitted form includes any input form or not;

marking said response page as phishing and blocking it when said response page has no input form;

warning said user about phishing content detection and allowing said user to continue using said website or stop interaction with it;

extracting by said deceptive content control layer the third and fourth fields (field 3, field 4) from said input form presented in said response page;

checking whether extracted from said input form the third and fourth fields (field 3, field 4) are the same with an initial input form of the first and second fields (field 1 and field 2);

marking said website as phishing and blocking said website when the third field (field 3) and the fourth (field 4) are different from the first field (field 1) and the second field (field 2);

warning said user about phishing content detection and allowing said user to continue using said website or stop interaction with it;

allowing said user the interaction with said website when the third field (field 3) and the fourth field (field 4) are the same as the first field (field 1) and the second field (field 2);

extracting the domain owner of said response page when said website is marked as phishing;

checking whether said domain owner of said response page is related with extracted said brand related items from said website by said deceptive content control layer;

identifying automatically said target brand of phishing page when said domain owner of said response page matches to the extracted said brand related items; and marking said response page as phishing but with unidentified target when said domain owner of said response page does not match to the extracted said brand related items.

2. The method according to claim 1 of fully automated target identification of a phishing website, where said deceptive content control layer triggers interaction with said website and analyzes its behavior before actual interaction with said user.

3. The method according to claim 1 of fully automated target identification of a phishing website, where said user is enabled with a functionality having "Allow this website" button after said false credentials have been submitted once.

4. The method according to claim 1 of fully automated target identification of a phishing website, where said deceptive content control layer system is deployed on endpoint or on network and tracks possible deceptive contents on said website being visited by said user.

5. A system of fully automated target identification of a phishing website, where a website requests from a user input data with deceptive contents (logo, URL path, text in html), and randomized/wrong data is being provided, afterwards the website is redirecting to a different domain related with the logo, URL path or text in html comprising:

said website received by said user where said website has an input form asking for sensitive information;

a deceptive content control layer deployed on said endpoint or said network and extracting, analyzing said brand related items from said website and making final verdict whether to block said website, allow said website to user and identifying said target brand when said website is phishing;

said brand related items identifying said well-known brand or company from logo, URL path or text in html and afterwards recorded;

said brand related items checked by said deceptive content control layer for a deceptive content match from a safe components repository and determining said input form is controlled upon matching said brand related items with said safe components repository;

said false credentials generated as said randomized/wrong data and submitted for said input form of phishing website in background when there is an evidence of said well-known brand or company;

checked by said deceptive content control layer said domain related with the legit said well-known brand or company, where said response page is hosted; and said phishing target identified automatically when said response page is hosted on said domain related with the legit said well-known brand or company and where said phishing target brand of said phishing website is identified comprising:

browsing said website by said user;

extracting said brand related items from said website by said deceptive content control layer;

allowing by said deceptive content control layer to said user to interact with said website, when unknown website has no said input form; marking said website as not phishing;

extracting first and second fields (field 1 and field 2) from said input form when said input form exists on said website;

generating said false credentials for the first field (field 1) and the second field (field 2) and submitting said input form in background using said false credentials when said website has said input form;

analyzing in background the content of said response page retrieved after form submission;

checking whether said response page of said false credentials submitted form includes any input form or not;

marking said response page as phishing and blocking it when said response page has no input form;

warning said user about phishing content detection and allowing said user to continue using said website or stop interaction with it;

extracting by said deceptive content control layer the third and fourth fields (field 3, field 4) from said input form presented in said response page;

checking whether extracted from said input form the third and fourth fields (field 3, field 4) are the same with the initial input form of the first and second fields (field 1 and field 2);

marking the said website as phishing and blocking it when the third field (field 3) and the fourth (field 4) are different from the first field (field 1) and the second field (field 2);

warning said user about phishing content detection and allowing said user to continue using said website or stop interaction with it;

allowing said user the interaction with said website when the third field (field 3) and the fourth field (field 4) are the same as the first field (field 1) and the second field (field 2);

extracting the domain owner of said response page when said website is marked as phishing;

checking whether said domain owner of said response page is related with extracted said brand related items from said website by said deceptive content control layer;

identifying automatically said target brand of phishing page when said domain owner of said response page matches to the extracted said brand related items; and marking said response page as phishing but with unidentified target when said domain owner of said response page does not match to the extracted said brand related items.

* * * * *